US011484981B2

(12) United States Patent
Murakami (10) Patent No.: US 11,484,981 B2
(45) Date of Patent: Nov. 1, 2022

(54) MACHINING METHOD IMPLEMENTED BY MACHINE TOOL (71) Applicant: HONDA MOTOR CO., LTD., Tokyo (JP)

(72) Inventor: Takafumi Murakami, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/333,053

(22) Filed: May 28, 2021

(65) Prior Publication Data
US 2021/0370453 A1 Dec. 2, 2021

(30) Foreign Application Priority Data

Jun. 1, 2020 (JP) .............................. JP2020-095214

(51) Int. Cl.
B23Q 3/155 (2006.01)
G01M 13/00 (2019.01)

(52) U.S. Cl.
CPC ......... *B23Q 3/15503* (2016.11); *G01M 13/00* (2013.01); *Y10T 483/10* (2015.01); *Y10T 483/12* (2015.01)

(58) Field of Classification Search
CPC ..... B23Q 3/15503; Y10T 483/12–138; G01M 13/00
USPC .................................... 483/1, 4–11; 700/179
See application file for complete search history.

(56) References Cited

U.S. PATENT DOCUMENTS 3,277,569 A * 10/1966 Verhoeven ......... B23Q 3/15766
483/5
3,358,360 A * 12/1967 Zankl ................. B23Q 3/15766
483/44
4,581,810 A * 4/1986 Kawakami ......... B23Q 3/15526
483/68

FOREIGN PATENT DOCUMENTS

DE     102005003220 A1 *  8/2006  ......... B23Q 17/2461
DE     102010047287 A1 *  3/2012  ......... B23Q 3/15526
JP     62-040134           8/1987
JP     63-077632           4/1988
JP     05-277866          10/1993
JP     2000-218459         8/2000

OTHER PUBLICATIONS

Japanese Office Action for Japanese Patent Application No. 2020-095214 dated Mar. 1, 2022.

* cited by examiner

*Primary Examiner* — Boyer D Ashley
*Assistant Examiner* — Michael Vitale
(74) *Attorney, Agent, or Firm* — Amin, Turocy & Watson, LLP (57) ABSTRACT A tool magazine of a machine tool holds machining tools of multiple types. The number of stored machining tools of at least one type is more than one. When all the machining tools of the at least one type are unused, a first test-machining step of machining a workpiece using one machining tool of each type is performed. When the machined product is graded as acceptable, a second test-machining step of replacing the machining tool of the at least one type with an unused machining tool in the tool magazine and machining a new workpiece using the one machining tool of each type is performed. The second test-machining step is repeated until all the machining tools are used.

4 Claims, 4 Drawing Sheets

FIG. 2

MACHINING METHOD IMPLEMENTED BY MACHINE TOOL

CROSS-REFERENCE TO RELATED APPLICATION

This application is based upon and claims the benefit of priority from Japanese Patent Application No. 2020-095214 filed on Jun. 1, 2020, the contents of which are incorporated herein by reference.

BACKGROUND OF THE INVENTION

Field of the Invention

The present invention relates to a machining method implemented by a machine tool including a tool magazine storing machining tools of multiple types, a spindle to which the machining tools are attached, and a tool changer exchanging the machining tools between the tool magazine and the spindle.

Description of the Related Art

As is commonly known, machine tools provided with spindles to which machining tools including drills, end mills, and reamers are attached are used for machining workpieces to, for example, produce predetermined structural members. In a case where the number of types of machining tools is larger than the number of spindles, machining using a first machining tool of one type is performed first, and then the first machining tool is replaced with a second machining tool of another type, which is stored in a tool magazine in advance. A tool changer takes the second machining tool out of the tool magazine while detaching the first machining tool from the spindle, and exchanges the first machining tool for the second machining tool. The first machining tool detached from the spindle is stored in the tool magazine as the tool changer operates. That is, the first machining tool and the second machining tool are exchanged by the tool changer.

JP S62-040134 B describes a method of exchanging tools by specifying which machining tools in a tool magazine are exchanged every time the machining tools are exchanged. In addition, JP H05-277866 A proposes a technique for reducing the time required for exchanging machining tools by rearranging the machining tools based on the machining time (time of use or usage count) of each machining tool.

SUMMARY OF THE INVENTION

In the above-described example, the usage counts of the first and second machining tools for replacement often differ from each other. Here, a usage count for replacement is set to less than the maximum number of times a machining tool can be used for machining workpieces with a predetermined accuracy, and is determined by a preliminary test.

For example, in a case where the usage counts of the first and second machining tools are 500 and 700, respectively, the first machining tool needs to be replaced with a new machining tool after the 500th workpiece is machined. Subsequently, the second machining tool is replaced with a new machining tool after the 700th workpiece is machined. The first machining tool is then replaced with a new machining tool after the 1,000th, 1,500th, and 2,000th workpieces are machined, and the second machining tool is replaced with a new machining tool after the 1,400th and 2,100th workpieces are machined. The replacement is performed by an operator manually, and the machining of workpieces needs to be halted during the replacement. That is, every time either the first machining tool or the second machining tool is replaced with a new machining tool, the machining of workpieces by the machine tool is forced to stop. This reduces the operating efficiency of the machine tool.

In addition, every time the first or the second machining tool is replaced with a new machining tool, it needs to be determined whether the accuracy of the machining tool in machining workpieces achieves a predetermined level. That is, after the first or second machining tool is replaced with a new machining tool, continuous machining for mass production cannot be restarted immediately. For the above-described reasons, the time from when machining of the first workpiece starts to when machining of the last workpiece is complete is disadvantageously prolonged.

A principal object of the present invention is to provide a machining method implemented by a machine tool and capable of improving the operating efficiency of the machine tool.

Another object of the present invention is to provide a machining method implemented by a machine tool and enabling continuous machining to be performed on a plurality of workpieces.

According to an aspect of the present invention, a machining method implemented by a machine tool, the machine tool including a tool magazine storing machining tools of a plurality of types, a spindle to which the machining tools are attached, and a tool changer configured to exchange the machining tools between the tool magazine and the spindle, the number of machining tools of at least one type among the machining tools of the plurality of types stored in the tool magazine being more than one, includes:

a first test-machining step of machining a workpiece using one of the machining tools of each of the plurality of types when all the machining tools of the at least one type are unused; and a second test-machining step of replacing the machining tool of the at least one type with an unused machining tool in the tool magazine and machining a new workpiece using the one of the machining tools of each of the plurality of types, wherein:

the second test-machining step is repeated until all the machining tools of the at least one type are used;

each of the machined workpieces obtained in the first test-machining step and each of the machined workpieces obtained in the second test-machining step undergo quality inspection; and when all the machined workpieces are graded as acceptable products, the machine tool shifts to a full machining step of continuously machining workpieces using one of the used machining tools of each of the plurality of types while the workpieces are changed.

According to the present invention, all the machining tools of all the types are assessed collectively in the first test-machining step and the second test-machining step so that machining tools that have been assessed as being able to produce acceptable products (machined products produced with acceptable machining accuracy) are used in the full machining step. This negates the need to assess whether the machining tools can produce acceptable products every time the machining tools are replaced with different machining tools. In other words, the continuous machining does not need to be interrupted to perform the assessment.

Moreover, the tool magazine holds a required number of machining tools of each type, and thereby the machining tools that have reached their usage counts for replacement can be automatically replaced with different machining tools by the tool changer. That is, the machine tool does not need to be stopped when the machining tools are replaced with different machining tools.

The above-described collective assessment and automatic replacement of the machining tools in combination enable the machine tool to operate continuously. That is, the operating efficiency of the machine tool can be improved.

In addition, the machining tools that have been assessed in the first test-machining step and the second test-machining step as being able to produce acceptable products are used in the full machining step of performing continuous machining while the workpieces are changed. As a result, acceptable products can be produced in large quantities by the continuous machining with no concern about production of unacceptable products.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

A preferred embodiment of a machining method according to the present invention implemented by a machine tool will be described in detail below with reference to the accompanying drawings.

Figure 1:
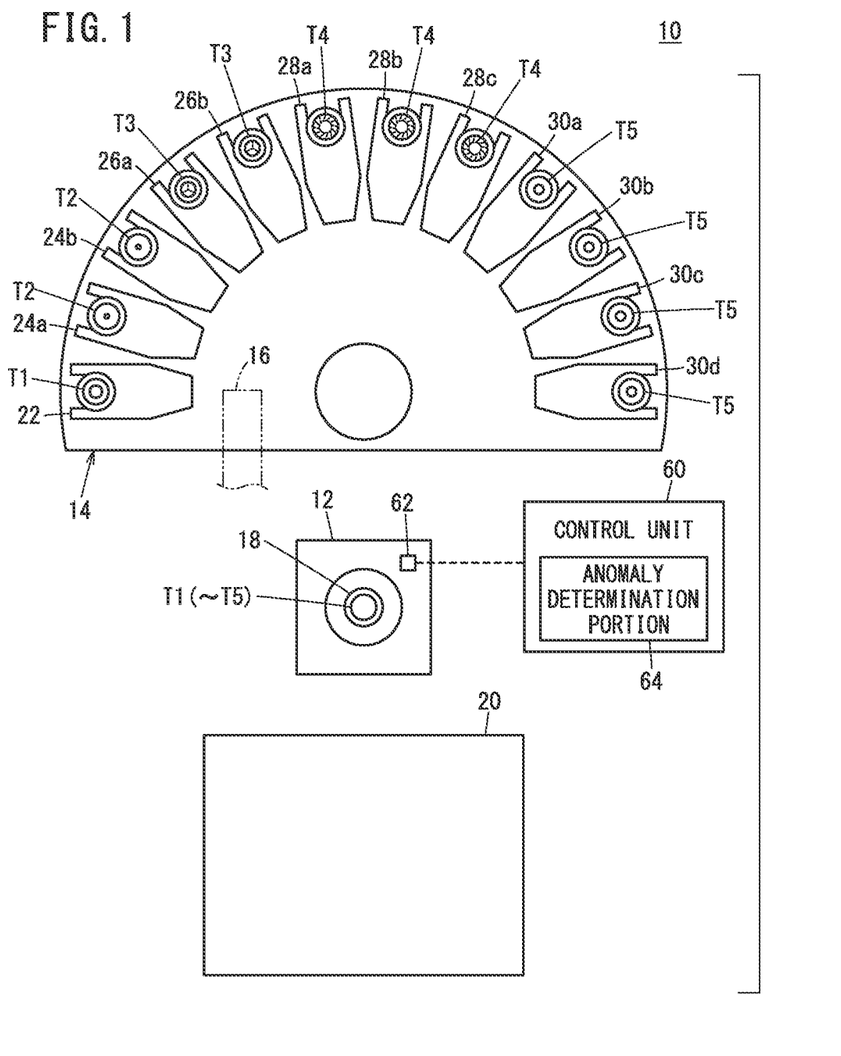
FIG. 1 is a schematic front view of a principal part of a machine tool for performing a machining method according to an embodiment of the present invention.

First, the machine tool implementing the machining method will be described with reference to FIG. 1. A machine tool 10 includes a head 12, a tool magazine 14, and a tool changer 16. The head 12 includes a spindle 18 rotated as a motor (not illustrated) operates. One of machining tools T1 to T5 is attached to the distal end of the spindle 18. As the spindle 18 rotates, the machining tool T1, T2, T3, T4, or T5 rotates integrally to perform a predetermined machining operation on a workpiece 20.

The tool magazine 14 has twelve slots 22, 24a, 24b, 26a, 26b, 28a to 28c, and 30a to 30d. The machining tool T1 is stored in the slot 22. The machining tools T2 are stored in the slots 24a and 24b. The machining tools T3 are stored in the slots 26a and 26b. The machining tools T4 are stored in the slots 28a to 28c. The machining tools T5 are stored in the slots 30a to 30d. More specifically, the tool magazine 14 holds five types of machining tools, and the numbers of machining tools T1 to T5, including those for replacement, are one, two, two, three, and four, respectively. That is, in this embodiment, the numbers of the four types of machining tools T2 to T5 stored in the tool magazine 14 are more than one.

The machining tools T1 to T5 are of different types for performing different machining operations and are typically cutting tools. For example, the machining tools T1 to T5 include drills, end mills, and reamers. All the machining tools T1 to T5 may be, for example, drills. In this case, the drills may be of different types for performing different machining operations. For example, the machining tool T1 and the machining tools T2 may be a stepped drill and cruciform drills, respectively.

Figure 2:
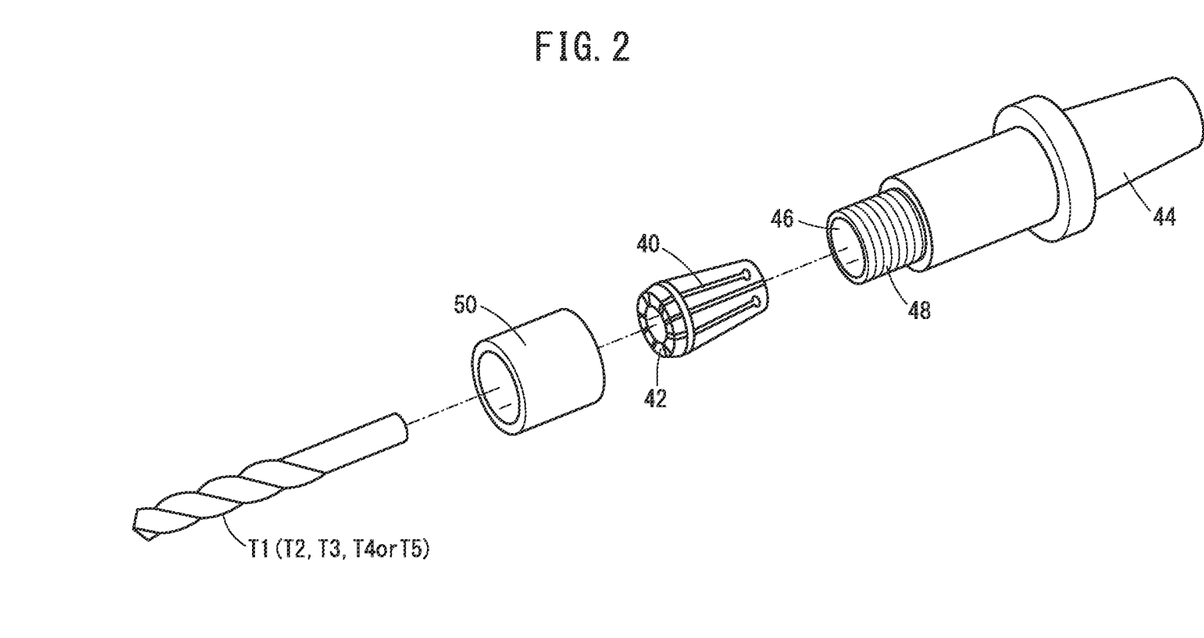
FIG. 2 is a schematic exploded view of a machining tool and a collet attached to a spindle constituting the machine tool.

As illustrated in FIG. 2, a collet 42 having slits 40 cut in the circumferential sidewall is fitted onto the shank of each of the machining tools T1 to T5. The shank of each of the machining tools T1 to T5 is inserted into the corresponding collet 42 by expanding the collet 42 within the range of elastic deformation. After the insertion, the collet 42 contracts to its original shape by the elastic effect, thereby gripping the shank.

A first end of the collet 42 is inserted into an insertion hole 46 formed in the distal end of a holder 44. The holder 44 also includes a threaded portion 48 cut in the distal end. A nut 50 is screwed onto the threaded portion 48. Part of the collet 42 exposed from the insertion hole 46 is accommodated in the nut 50, and thereby the shank of each of the machining tools T1 to T5 is fitted in the holder 44.

Although not illustrated, the spindle 18 constituting the head 12 has a holder engagement hole in which the holder 44 can be detachably fitted. The holder 44 is fitted in the holder engagement hole, and thereby the machining tools T1 to T5 are attached to the spindle 18.

The tool changer 16 exchanges the machining tool T1 attached to the spindle 18 for one of the machining tools T2 to T5. As described above, this exchange enables machining operations different from that using the machining tool T1 to be performed. As the tool changer 16 is well known to those skilled in the art, detailed illustrations and descriptions thereof will be omitted.

The machine tool 10 further includes a control unit 60. The control unit 60 stores the usage count of each of the machining tools T1 to T5 for replacement. The usage count for replacement is set to approximately half the maximum usage count. The maximum usage count here refers to the maximum number of times the machining tool can be used for machining the workpiece 20 with a predetermined accuracy. In this embodiment, the usage counts of the machining tools T1 to T5 for replacement are 2,000, 1,000, 1,000, 700, and 450, respectively, for ease of understanding.

The control unit 60 includes a current measurement portion 62 configured to detect a load current value at the machining tool T1, T2, T3, T4, or T5 attached to the spindle 18, and an anomaly determination portion 64 configured to determine whether an anomaly is occurring based on the load current value. The current measurement portion 62 and the anomaly determination portion 64 enable anomalies such as fracture and chipping of the machining tools T1 to T5 to be detected.

Next, the machining method according to this embodiment implemented by the machine tool 10 will be described.

Figure 3:
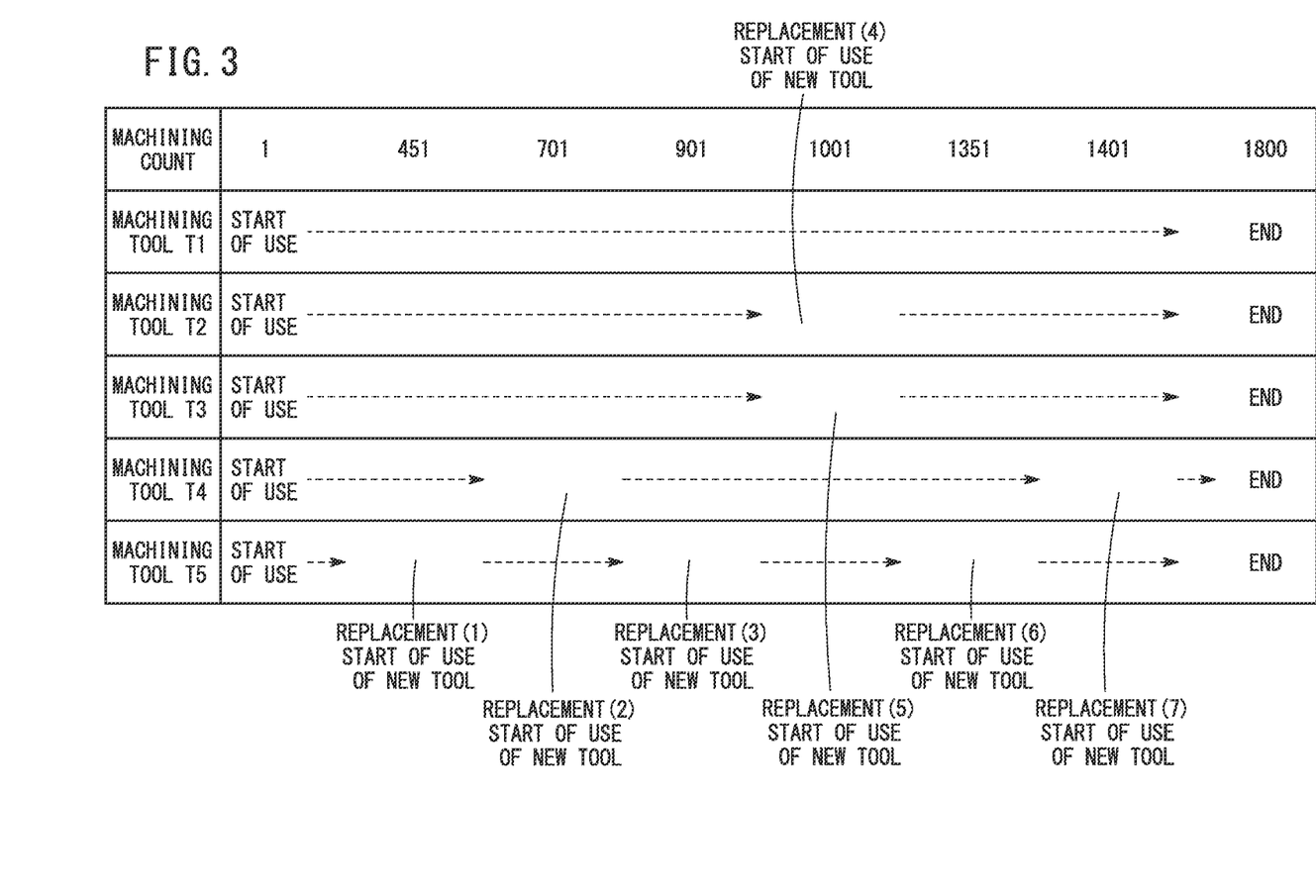
FIG. 3 is a time chart illustrating usage counts for replacement in a case where a tool magazine holds five types of machining tools.

To machine 1,800 workpieces 20 (before the machining count reaches 1,800), for example, the numbers of times the machining tools T1 to T5 are replaced are zero, one, one, two, and three, respectively. That is, in this case, the machining tools need to be replaced seven times while the 1,800 workpieces 20 are machined as illustrated in FIG. 3. In a case where the tool magazine 14 holds each one of the machining tools T1 to T5, that is, in a case where the tool magazine 14 does not hold the machining tools T1 to T5 for replacement, machining by the machine tool 10 needs to be halted so that an operator can replace the machining tools that have reached their usage counts for replacement. As no machining operations can be performed during the replacement, the operating efficiency of the machine tool 10 decreases accordingly. Thus, the time from when machining of the first workpiece 20 starts to when machining of the 1,800th (last) workpiece 20 is complete is prolonged.

In addition, every time the machining tools T2 to T5 are replaced with new machining tools, the quality of the machined products needs to be checked after the workpieces 20 are machined. If the machining continues without quality check, unacceptable products that do not satisfy a predetermined quality level may be produced continuously. Thus, the continuous machining needs to be interrupted for the quality check. This also causes an increase in the time before all the workpieces 20 are machined.

To deal with this, in the machining method according to this embodiment, test machining is performed using all the machining tools T1 to T5 before continuous machining is performed on the workpieces 20 to assess the quality. The quality is graded as acceptable or unacceptable by, for example, determining whether the deviations of the diameters, depths, and positions of holes bored during machining from design values are within allowable ranges. Specifically, the workpieces 20 with deviations that are within the allowable ranges are graded as acceptable products, and the workpieces 20 with deviations that are out of the allowable ranges are graded as unacceptable products. The assessment results are sent to the control unit 60 as a control signal.

Figure 4:
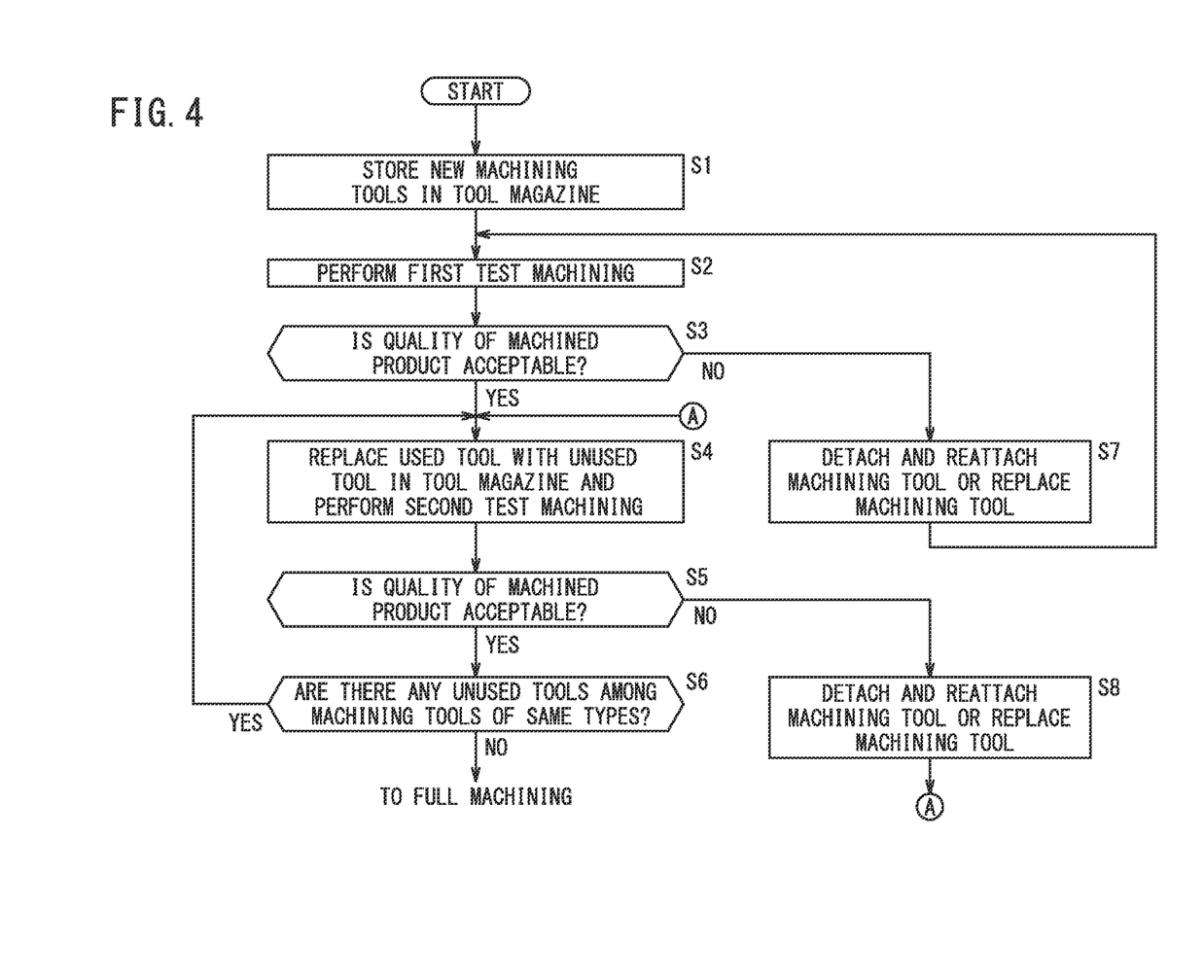
FIG. 4 illustrates a schematic flow of the machining method according to the embodiment of the present invention.

The machining method according to this embodiment will now be described in detail with reference to a schematic flow illustrated in FIG. 4. For ease of understanding, the machining tools T1 to T5 in this example are all unused (new). More specifically, the machining method includes an unused-tools storage step S1, a first test-machining step S2, a first assessment step S3, a second test-machining step S4, a second assessment step S5, and a determining step S6.

First, in the unused-tools storage step S1, the new machining tools T1 to T5 are stored in the tool magazine 14. The numbers of machining tools T1 to T5 are one, two, two, three, and four, respectively. As described above, the machining tool T1 is stored in the slot 22. The two machining tools T2 are stored in the slots 24a and 24b. The two machining tools T3 are stored in the slots 26a and 26b. The three machining tools T4 are stored in the slots 28a to 28c. The four machining tools T5 are stored in the slots 30a to 30d.

Next, as the tool changer 16 operates, the machining tool T1 is taken out of the slot 22 and attached to the spindle 18. With this attachment, a detection signal is sent from a sensor provided for the spindle 18 to the control unit 60. Upon receiving the detection signal, the control unit 60 moves either the workpiece 20 or the spindle 18 to bring the workpiece 20 and the spindle 18 close to each other. Furthermore, the control unit 60 energizes the motor to rotate so that the spindle 18 and the machining tool T1 rotate integrally. As the workpiece 20 further approaches the spindle 18, a predetermined machining operation is performed on the workpiece 20 by the rotating machining tool T1. The first test-machining step S2 starts at this point.

Upon completion of the machining operation by the machining tool T1, the machining tool T1 is separated from the workpiece 20. The tool changer 16 then detaches the machining tool T1 from the spindle 18 and returns the machining tool T1 to the slot 22 under the control exerted by the control unit 60. Furthermore, the tool changer 16 takes the machining tool T2 out of the slot 24a and attaches the machining tool T2 to the spindle 18. Subsequently, a predetermined machining operation is performed on the workpiece 20 by the rotating machining tool T2 in the same manner as above.

Upon completion of the machining operation by the machining tool T2, the machining tool T2 is separated from the workpiece 20. The tool changer 16 then detaches the machining tool T2 from the spindle 18 and returns the machining tool T2 to the slot 24a under the control exerted by the control unit 60. Furthermore, the tool changer 16 takes the machining tool T3 out of the slot 26a and attaches the machining tool T3 to the spindle 18. Subsequently, a predetermined machining operation is performed on the workpiece 20 by the rotating machining tool T3 in the same manner as above.

Hereafter, the machining tool attached to the spindle 18 is exchanged for the machining tool T4 in the slot 28a and the machining tool T5 in the slot 30a sequentially, and the workpiece 20 is machined in the same manner as above. Upon completion of the machining operation using the machining tools T5, the first test-machining step S2 ends, and a machined product (machined workpiece) is obtained from the workpiece 20.

Next, the first assessment step S3 is performed. More specifically, for example, it is determined whether the deviations of the diameters, depths, and positions of holes bored in the machined product using the machining tools T1 to T5 from design values are within allowable ranges, in other words, whether the machining accuracy is acceptable. The workpiece 20 is graded as an acceptable product when the deviations are within the allowable ranges, and the workpiece 20 is graded as an unacceptable product when the deviations are out of the allowable ranges. The control unit 60 receives the assessment result as a control signal.

If an unacceptable product is produced, the control unit 60 informs of the production of the unacceptable product by, for example, warning sound or warning light. At this moment, for example, if the accuracy of the machining tool T3 in machining the holes is unacceptable, it is conceivable that the collet 42 or the holder 44 may not be accurately attached to the shank of the machining tool T3. In this case, the process proceeds to a first troubleshooting step S7 in which the operator detaches and reattaches the collet 42 or the holder 44 to the machining tool T3.

Subsequently, the first test-machining step S2 is performed using a new workpiece 20, and the first assessment step S3 is performed using the machined product produced in the first test-machining step S2. If the accuracy in machining the machined product is acceptable, the process proceeds to the second test-machining step S4 under the control exerted by the control unit 60. If the accuracy of the machining tool T3 in machining the holes is still unacceptable at this point, the machining tool T3 may be defective. To deal with this, the machining tool T3 is replaced with a new machining tool in the first troubleshooting step S7, and the first test-machining step S2 and the first assessment step S3 are performed using a new workpiece 20. The machining tool T3 may be immediately replaced with a new machining tool without detaching and reattaching the collet 42 or the holder 44.

In the first test-machining step S2 and the first assessment step S3, the accuracies of the machining tools T2 to T5 stored in the slots 24b, 26b, 28b, 28c, and 30b to 30d in machining workpieces are not assessed. Thus, in the next step, the remaining machining tools T2 to T5 are used to produce machined products.

Specifically, the first round of the second test-machining step S4 is performed using a new workpiece 20. In this case, the machining tool T1 stored in the slot 22, the machining tool T2 stored in the slot 24b, the machining tool T3 stored in the slot 26b, the machining tool T4 stored in the slot 28b, and the machining tool T5 stored in the slot 30b are used sequentially to machine the workpiece 20.

Next, the second assessment step S5 is performed. More specifically, for example, it is determined whether the deviations of the diameters, depths, and positions of the holes bored in the machined product using the machining tools T1 to T5 from the design values are within the allowable ranges (whether the machining accuracy is acceptable) as in the first assessment step S3. If the accuracy of the machining tool T3 in machining the holes is unacceptable, for example, the process proceeds to a second troubleshooting step S8 in which the operator detaches and reattaches the collet 42 or the holder 44 to the machining tool T3.

Subsequently, the second test-machining step S4 is performed using a new workpiece 20, and the second assessment step S5 is performed using the machined product produced in the second test-machining step S4. If the accuracy of the machining tool T3 in machining the holes is still unacceptable at this point, the machining tool T3 is replaced with a new machining tool in the second troubleshooting step S8, and the second test-machining step S4 and the second assessment step S5 are performed using a new workpiece 20. The machining tool T3 may be immediately replaced with a new machining tool without detaching and reattaching the collet 42 or the holder 44 in the same manner as above.

If the accuracy in machining the machined product is acceptable, the process proceeds to the determining step S6 under the control exerted by the control unit 60. In the determining step S6, the control unit 60 determines whether there are any unused machining tools that have not been used for machining among the machining tools of the same types. This is done by, for example, determining whether there are any machining tools (individual pieces) that have not been taken out of the slots 22, 24a, 24b, 26a, 26b, 28a to 28c, and 30a to 30d by the tool changer 16 based on records of control performed by the control unit 60 on the tool changer 16.

At the point in time when the first test-machining step S2 and the first round of the second test-machining step S4 end through the process above, machining operations using the machining tool T4 stored in the slot 28c and the machining tools T5 stored in the slots 30c and 30d have not been performed. Upon determining this, the control unit 60 returns the process from the determining step S6 to the second test-machining step S4 to perform the second round of the second test-machining step S4 using the machining tool T4 stored in the slot 28c and the machining tool T5 stored in the slot 30c.

Specifically, the machining tool T1 stored in the slot 22, the machining tool T2 stored in the slot 24a, the machining tool T3 stored in the slot 26a, the machining tool T4 stored in the slot 28c, and the machining tool T5 stored in the slot 30c are used sequentially to machine a new workpiece 20. As can be seen from the above, in this embodiment, the machining tools T1 to T3 used in the first round of the second test-machining step S4, that is, the machining tools T1 to T3 used in the first test-machining step S2, are reused as there are no unused machining tools T1 to T3 at this point in time.

Next, the second assessment step S5 is performed on the machined product. If the machining accuracy is unacceptable, the process proceeds to the second troubleshooting step S8, and the machining tools may be detached and reattached or may be replaced in the same manner as above.

If the accuracy in machining the machined product is acceptable, the process proceeds to the determining step S6 under the control exerted by the control unit 60. That is, the control unit 60 determines whether there are any unused machining tools that have not been used for machining among the machining tools of the same types. At this point, the machining operation using the machining tool T5 stored in the slot 30d has not been performed. Upon determining this, the control unit 60 returns the process from the determining step S6 to the second test-machining step S4 to perform the third round of the second test-machining step S4 using the machining tool T5 stored in the slot 30d.

In the third round of the second test-machining step S4, the machining tools T1 to T4 used in the first round of the second test-machining step S4 are reused as there are no unused machining tools T1 to T4 at this point in time. That is, the machining tool T1 stored in the slot 22, the machining tool T2 stored in the slot 24a, the machining tool T3 stored in the slot 26a, the machining tool T4 stored in the slot 28a, and, finally, the machining tool T5 stored in the slot 30d are used sequentially to machine a new workpiece 20.

Next, the second assessment step S5 is performed on the machined product. If the machining accuracy is unacceptable, the process proceeds to the second troubleshooting step S8, and the machining tool may be detached and reattached or may be replaced in the same manner as above.

If the accuracy in machining the machined product is acceptable, the process proceeds to the determining step S6. At this point, there is no unused machining tool that has not been used for machining. Upon determining this, the control unit 60 finishes the test machining. Subsequently, the machine tool 10 shifts to a full machining step under the control exerted by the control unit 60. In the full machining step, machining of the workpiece 20 is continuously performed using the machining tools T1 to T5 while the workpiece 20 is exchanged for new workpieces.

In the first round of the full machining step, the machining tools T1 to T5 used in the first test-machining step S2 are used. Each of the machining tools T1 to T5 has been assessed as being able to produce acceptable products (machined products produced with acceptable machining accuracy) in the first assessment step S3. Thus, acceptable products are produced even when the machining tools T1 to T5 used in the first test-machining step S2 continue to be used in the first and subsequent rounds of machining. That is, acceptable products can be produced in large quantities by the continuous machining with no concern about production of unacceptable products.

The control unit 60 takes the usage counts of the machining tools T1 to T5 during continuous machining. When the machining count reaches 450, the control unit 60 determines that the machining tool T5 has reached its usage count for replacement. Thus, in the 451st and subsequent rounds of machining, the machining tool stored in the slot 30b is taken out and attached to the spindle 18 by the tool changer 16 for the machining operation using the machining tool T5.

When the machining count reaches 700 as the continuous machining continues further, the control unit 60 determines that the machining tool 14 has reached its usage count for replacement. Thus, in the 701st and subsequent rounds of machining, the machining tool stored in the slot 28*b* is taken out and attached to the spindle 18 by the tool changer 16 for the machining operation using the machining tool T4.

Next, when the machining count reaches 900, the control unit 60 determines that the machining tool T5 has reached its usage count for replacement. Thus, in the 901st and subsequent rounds of machining, the machining tool stored in the slot 30*c* is taken out and attached to the spindle 18 by the tool changer 16 for the machining operation using the machining tool T5.

Similarly, in the 1,001st and subsequent rounds of machining, the machining tools stored in the slots 24*b* and 26*b* are taken out and attached to the spindle 18 for the machining operations using the machining tools T2 and T3, respectively. Furthermore, the machining tool T5 stored in the slot 30*d* is used in the 1,351st and subsequent rounds of machining, and the machining tool T4 stored in the slot 28*c* is used in the 1,401st and subsequent rounds of machining. That is, in the case where the full machining step is performed 1,800 times, the machining tools T2 to T5 are replaced with unused machining tools seven times in total.

The machining tools T2 to T5 stored in the slots 24*b*, 26*b*, 28*b*, 28*c*, and 30*b* to 30*d* have been assessed as being able to produce acceptable products in the second assessment step S5. Thus, acceptable products are also produced during machining after replacement. That is, after the replacement of the machining tools T2 to T5, acceptable products can also be produced in large quantities by the continuous machining without concern about production of unacceptable products.

In this manner, in this embodiment, all the machining tools T1 to T5 are assessed collectively in the first test-machining step S2 and the second test-machining step S4 so that machining tools that have been assessed as being able to produce acceptable products are used in the full machining step. This negates the need to assess whether the machining tools can produce acceptable products every time the machining tools T2 to T5 are replaced with different machining tools. That is, the continuous machining does not need to be interrupted to perform the assessment.

In addition, in this embodiment, the tool magazine 14 holds required numbers of machining tools T1 to T5 to perform machining the number of times equal to the total machining count or more. In this case, the machining tools T2 to T5 that have reached their usage counts for replacement are automatically replaced with different machining tools by the tool changer 16 under the control exerted by the control unit 60. That is, the machine tool 10 does not need to be stopped while the machining tools T2 to T5 are replaced with different machining tools. The above-described collective assessment and automatic replacement of the machining tools in combination enable the machine tool 10 to operate continuously. Thus, the operating efficiency of the machine tool 10 improves accordingly, resulting in an improvement in the efficiency in producing the machined products.

In addition, the acceptable products produced in the first test-machining step S2 and the second test-machining step S4 can also be treated in a manner similar to the acceptable products produced in the full machining step. Consequently, all the acceptable products can be used without being wasted.

In a case where the full machining step is repeated more than 2,000 times, at least all the machining tools T1 to T3 need to be replaced with new machining tools before the 2,001st round of machining is performed. In this case, the machine tool 10 is stopped, and then the first test-machining step S2 to the determining step S6 may be performed along the schematic flow illustrated in FIG. 4 in the same manner as above. In this manner, the machining method according to this embodiment can also be implemented when only some of the machining tools T1 to T5 are unused.

While the first test-machining step S2, the second test-machining step S4, and the full machining step are performed, the load current value at the machining tool T1, T2, T3, 14, or T5 is measured by the current measurement portion 62. Here, it is presumed that an anomaly including fracture and chipping could occur in the machining tool T1, T2, T3, 14, or T5 if the machining tool is subjected to an abnormal load. If an anomaly occurs in the machining tool T3, for example, the load current value at the machining tool T3 becomes higher than a normal value. This is because the frictional resistance between the machining tool T3 in which an anomaly has occurred and the workpiece 20 increases and results in an increase in the value of current supplied to the machining tool T3 to rotate the machining tool T3.

The anomaly determination portion 64 recognizes that the load current value exceeds a predetermined value based on the detection signal provided by the current measurement portion 62. With this, the anomaly determination portion 64 determines that an anomaly has occurred in the machining tool T3 (that the machining cannot be continued). In this case, for example, the machine tool 10 is halted, and the machining tool T3 is replaced with a new machining tool. Alternatively, if an anomaly occurs in the machining tool T3 stored in the slot 26*a*, the machining tool T3 stored in the slot 26*b* may be used in the subsequent machining operations.

The present invention is not limited in particular to the embodiment described above, and various modifications can be made thereto without departing from the scope of the present invention.

For example, in this embodiment, the machining tools used in the second and subsequent rounds of the second test-machining step S4 are those used in the first test-machining step S2 except for the unused machining tools. However, there is no particular need to do so. For example, the machining tools T2 and T3 in the slots 24*b* and 26*b* used in the second round of the second test-machining step S4 may be used in the third and subsequent rounds of the second test-machining step S4.

Moreover, although machining areas of the machining tools T1 to T5 differ from each other in many cases, two or more of the machining tools T1 to T5 may be used for machining identical areas. Yet moreover, in the example above, the machining tool T1 (to T4) is exchanged for the machining tool T2 (to T5) after being used for a single machining operation. However, the machining tool T1 (to T4) may be exchanged for the machining tool T2 (to T5) after being used for multiple machining operations performed while the posture of one workpiece 20 is changed. Alternatively, after a series of machining operations by the machining tools T1 to T5, the machining tools T1 to T5 may be used for machining a different area of the same workpiece 20.

Furthermore, the number of machining tool types and the number of each machining tool are not limited to those described in the example above and may be set to any numbers.

What is claimed is:

1. A machining method implemented by a machine tool including a tool magazine storing machining tools of a plurality of types, a spindle to which the machining tools are attached, and a tool changer configured to exchange the machining tools between the tool magazine and the spindle, a number of machining tools of a first type of the plurality of types stored in the tool magazine being one, and a number of machining tools of at least one further type of the plurality of types stored in the tool magazine being more than one, the machining method comprising:

a first test-machining step in which a first workpiece is machined using the one of the machining tools of the first type when the one of the machining tools is held by the spindle and a first machining tool of the at least one further type of the plurality of types when the first machining tool is held by the spindle, wherein the one of the machining tools of the first type and the first machining tool of the at least one further type are each unused prior to the first test-machining step; and a second test-machining step in which a previously unused second machining tool of the at least one further type is utilized, and in which machining of a second workpiece is performed using the one of the machining tools of the first type when the one of the machining tools is held by the spindle and the second machining tool of the at least one further type of the plurality of types when the second machining tool is held by the spindle, wherein:

the second test-machining step is repeated until each of the machining tools of the at least one further type is used;

the machined first workpiece obtained in the first test-machining step and the machined second workpiece obtained in the second test-machining step undergo quality inspection; and when all the machined workpieces are graded as acceptable products, the machine tool shifts to a full machining step of continuously machining workpieces using one of the used machining tools of each of the plurality of types.

2. The machining method according to claim 1, wherein each of the machining tools used in the first test-machining step is a previously unused machining tool.

3. The machining method according to claim 1, wherein, in a case where the at least one further type of the plurality of types comprises at least two types of the plurality of types and numbers of machining tools of the at least two types among the machining tools of the plurality of types stored in the tool magazine are more than one and differ from each other, and where each of the machining tools of one of the at least two types are used in the second test-machining step whereas the machining tools of a remainder of the at least two types still include an unused machining tool, the machining tool of the one of the at least two types used in the first test-machining step and the unused machining tool of the remainder of the at least two types are used in a subsequent round of the second test-machining step.

4. The machining method according to claim 1, wherein a first round of the full machining step is performed using the one of the machining tools of the first type and the first machining tool of the at least one further type of the plurality of types used in the first test-machining step.

* * * * *